(12) United States Patent
Bohanan et al.

(10) Patent No.: US 11,440,675 B2
(45) Date of Patent: Sep. 13, 2022

(54) AIRCRAFT FLIGHT GUIDANCE PANELS WITH A DISPLAY DISPOSED BETWEEN TWO INPUT PORTIONS

(71) Applicant: Gulfstream Aerospace Corporation, Savannah, GA (US)

(72) Inventors: Scott Bohanan, Savannah, GA (US); Jeffrey Hausmann, Savannah, GA (US); Bethany Davis, Savannah, GA (US); Andrew Martin, Savannah, GA (US); Kristin Medin, Savannah, GA (US)

(73) Assignee: Gulfstream Aerospace Corporation, Savannah, GA (US)

( * ) Notice: Subject to any disclaimer, the term of this patent is extended or adjusted under 35 U.S.C. 154(b) by 0 days.

(21) Appl. No.: 15/984,658

(22) Filed: May 21, 2018

(65) Prior Publication Data

US 2019/0352018 A1 Nov. 21, 2019

(51) Int. Cl.
| | |
|---|---|
| *B64D 43/00* | (2006.01) |
| *G06F 3/01* | (2006.01) |
| *G06F 3/02* | (2006.01) |
| *G06F 3/0362* | (2013.01) |
| *G06F 3/04847* | (2022.01) |
| *G06F 3/04886* | (2022.01) |
| *G06F 3/14* | (2006.01) |

(52) U.S. Cl.
CPC ............ *B64D 43/00* (2013.01); *G06F 3/013* (2013.01); *G06F 3/02* (2013.01); *G06F 3/0362* (2013.01); *G06F 3/04847* (2013.01); *G06F 3/04886* (2013.01); *G06F 3/1423* (2013.01); *G06F 2203/04803* (2013.01)

(58) Field of Classification Search
CPC ........ B64D 43/00; B64D 13/04; B64D 47/02; B64D 45/0015; G06F 3/013; G08G 5/003; G08G 5/0047
USPC ........................................................ 345/173
See application file for complete search history.

(56) References Cited

U.S. PATENT DOCUMENTS

| | | | | |
|---|---|---|---|---|
| 4,083,239 A | * | 4/1978 | Malcolm | G01C 23/005 340/980 |
| 4,397,555 A | * | 8/1983 | Malcolm | G01C 23/005 340/980 |
| 4,616,226 A | * | 10/1986 | Morley | G01C 15/14 340/980 |
| 5,978,715 A | | 11/1999 | Briffe et al. | |
| 6,803,860 B1 | * | 10/2004 | Langner | G01C 23/00 340/971 |
| 6,842,122 B1 | | 1/2005 | Langner et al. | |
| 6,980,198 B1 | * | 12/2005 | Gyde | B64D 43/00 345/157 |
| 9,457,914 B1 | | 10/2016 | Cline et al. | |
| 9,586,695 B2 | * | 3/2017 | Voros | B64C 13/0421 |

(Continued)

*Primary Examiner* — Fred Tzeng

(74) *Attorney, Agent, or Firm* — LKGlobal | Lorenz & Kopf, LLP

(57) ABSTRACT

A flight guidance panel for an aircraft includes a first user input portion, a second user input portion, a display, and a controller. The display is disposed between the first user input portion and the second user input portion. The controller is configured for generating a first functional panel associated with a first flight parameter for presentation on the display. The controller is further configured for generating a second functional panel associated with a second flight parameter for presentation on the display.

15 Claims, 2 Drawing Sheets

(56) References Cited

U.S. PATENT DOCUMENTS

| | | | |
|---|---|---|---|
| 10,761,676 B1* | 9/2020 | Gilbert | G06F 3/1454 |
| 2004/0021581 A1* | 2/2004 | Weigl | B64D 45/0015 |
| | | | 340/945 |
| 2007/0198141 A1* | 8/2007 | Moore | G01D 5/342 |
| | | | 701/3 |
| 2010/0036549 A1* | 2/2010 | Kwan | B64D 1/16 |
| | | | 701/7 |
| 2010/0073199 A1* | 3/2010 | Christophe | G01C 23/00 |
| | | | 340/963 |
| 2010/0116842 A1 | 5/2010 | Hecht et al. | |
| 2012/0327104 A1* | 12/2012 | Schrauben | G01C 23/00 |
| | | | 345/619 |
| 2014/0049407 A1* | 2/2014 | Voros | B64D 47/02 |
| | | | 340/963 |
| 2014/0074325 A1* | 3/2014 | Nikolic | G01C 23/005 |
| | | | 701/14 |
| 2016/0185448 A1 | 6/2016 | Scacchi et al. | |
| 2017/0168680 A1* | 6/2017 | Fourneau-Pelletier | |
| | | | G06F 3/0482 |
| 2017/0259935 A1 | 9/2017 | Hausmann et al. | |
| 2017/0358219 A1* | 12/2017 | Garai | G08G 5/0047 |
| 2019/0094041 A1* | 3/2019 | Casia | G01C 23/005 |
| 2019/0279514 A1* | 9/2019 | Ramachandra | G08G 5/003 |

* cited by examiner

AIRCRAFT FLIGHT GUIDANCE PANELS WITH A DISPLAY DISPOSED BETWEEN TWO INPUT PORTIONS

TECHNICAL FIELD

The present invention generally relates to aircraft flight guidance panels, and more particularly relates to flight guidance panels with a single screen disposed between two user input portions.

BACKGROUND

Conventional transport category flight guidance panels are primarily implemented in hardware. Knobs and buttons control specific functions and the functions are stenciled on the panel itself. Annunciations are provided using lamps or lights. Selections are displayed using numerical readouts, usually consisting of seven segment displays. The flight guidance panels are typically mounted in the instrument panel in front of the pilots in a flight deck. The physical height of the flight guidance panels partially determines how much visibility the pilot has out of the front windshield of the aircraft. These conventional flight guidance panels are suitable for their intended purposes, but there is room for improvement.

Accordingly, it is desirable to provide aircraft and systems for flight guidance panels. Furthermore, other desirable features and parameters of the present invention will become apparent from the subsequent detailed description of the invention and the appended claims, taken in conjunction with the accompanying drawings and this background of the invention.

BRIEF SUMMARY

Various non-limiting embodiments of flight guidance panels and aircraft are disclosed herein.

In a first non-limiting embodiment, a flight guidance panel for an aircraft includes a first user input portion, a second user input portion, a display, and a controller. The display is disposed between the first user input portion and the second user input portion. The controller is configured for generating a first functional panel associated with a first flight parameter for presentation on the display. The controller is further configured for generating a second functional panel associated with a second flight parameter for presentation on the display.

In a second non-limiting embodiment, a flight guidance panel for an aircraft includes a first user input portion, a second user input portion, and a display. The first user input portion has a first button of the first user input portion, a second button of the first user input portion, and a knob of the first user input portion. The second user input portion has a first button of the second user input portion, a second button of the second user input portion, and a knob of the second user input portion. The display is disposed between the first user input portion and the second user input portion and has dimensions configured to present a multi-function panel and four functional panels associated with flight parameters of the aircraft.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Flight Guidance Panels (FGPs) described herein generally have a single display screen and two control knobs, each located on one of the pilot and co-pilot sides of the FGP. The control knobs may be single or double shaft optical encoders with or without an integrated pushbutton. The two control knobs provide redundancy in case of an encoder failure. Two momentary pushbuttons are located to the sides of each control knob. Because the physical height of the FGP controls the size of the glare screen at the front of the flight deck, the provided layout permits a shorter FGP to provide a less obstructed view out the cockpit windows over the glare shield.

Furthermore, the provided FGP indicates the current aircraft modes during flight. For example, a pilot may quickly determine if the aircraft is climbing or descending by referencing the position of arrow symbology displayed in the Altitude panel. Also, Autopilot and Flight Director modes on and off are clearly indicated.

Figure 1:
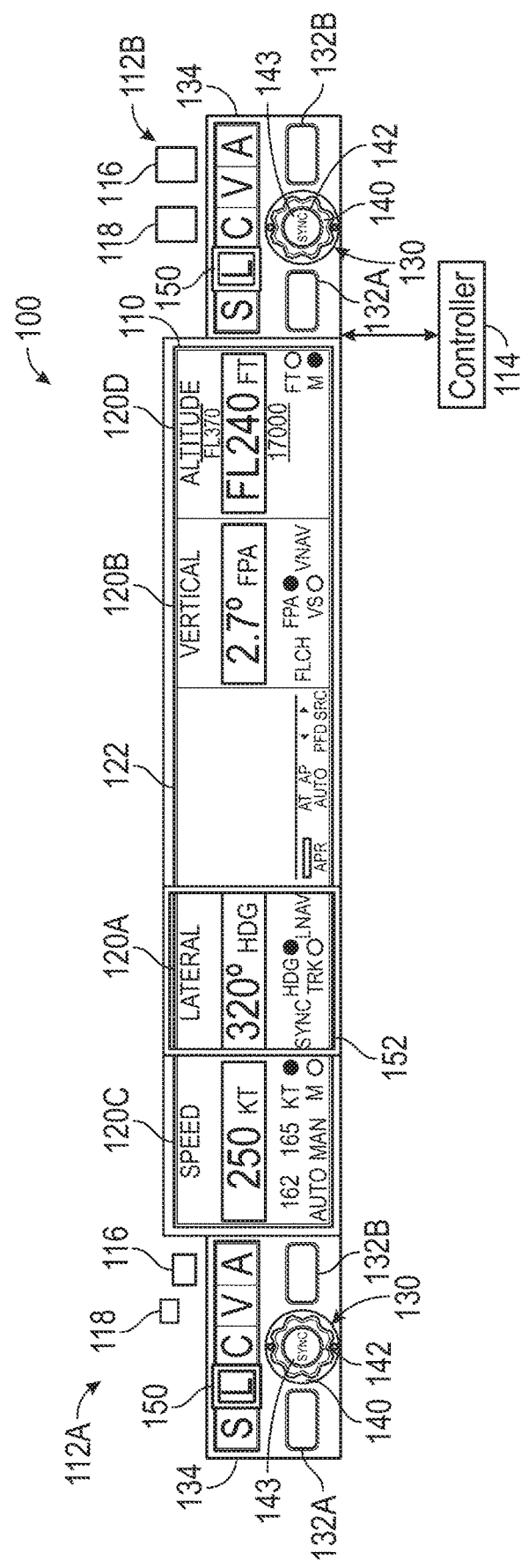
FIG. 1 is a simplified schematic view illustrating a non-limiting embodiment of a flight guidance panel system in accordance with the teachings of the present disclosure.

FIG. 1 is schematic view illustrating a non-limiting embodiment of a flight guidance panel (FGP) 100 system in accordance with teachings of the present disclosure. FGP 100 includes a display 110, a first user input portion 112A, a second user input portion 112B, a controller 114, an eye tracking sensor 116, and a proximity sensor 118.

Display 110 is disposed between first user input portion 112A and second user input portion 112B. In the example provided, display 110 is composed of single touch capable screen. For example, the single screen may include a continuous glass or plastic sheet extending across the entire width and height of display 110. In the example provided, the sheet is suitable for aviation and complies with aircraft certification requirements. Touch capability may utilize any suitable technology that indicates to controller 114 where an object is touching or is near display 110. In some embodiments, display 110 includes multiple screens. For example, multiple screens may be utilized for redundant power and control purposes to meet safety and certification requirements. When one screen fails, the data associated with the failed screen may be displayed on a remaining working screen to ensure continued functionality.

In the example provided, display 110 is sunlight readable, is full color, has sufficient resolution to clearly render text when the flight crew is seated at design eye, and features power and display driver redundancy to provide robust availability. For example, display 110 may be implemented as organic light emitting diode (OLED) panels, light emitting diode (LED) panels, or any other suitable display technology.

Display 110 presents a plurality of functional displays and a multi-functional display. For example, controller 114 may be configured for generating a first functional panel associated with a first flight parameter for presentation on the display, generating a second functional panel associated with a second flight parameter for presentation on the display, generating a third functional panel associated with a third flight parameter for presentation on the display, and generating a fourth functional panel associated with a fourth flight parameter for presentation on the display. In the example provided, display 110 presents a first functional panel 120A, a second functional panel 120B, a third functional panel 120C, a fourth functional panel 120D, and a multi-function panel 122.

Functional panels 120A-D are each associated with a navigational parameter of flight, such as airspeed, heading, course, vertical speed, altitude, or other parameters typically associated with flight guidance panels. As used herein, the term "flight parameter" refers to a value quantifying the movement of an aircraft and that may be controlled or managed by an autopilot of the aircraft. In general, each functional panel presents a target value for the flight parameter and selectors for changing which aircraft mode is active in FGP 100. As used herein, the term "functional panel" means a portion of display 110 that includes only information that is related to the flight parameter and aircraft modes that may manage the flight parameter.

In the example provided, first functional panel 120A is a Lateral panel, second functional panel 120B is a Vertical panel, third functional panel 120C is a Speed panel, and fourth functional panel 120D is an Altitude panel. In some embodiments, different flight parameters, the same flight parameters in a different order, or combinations thereof may be associated with functional panels 120A-D. In the example provided, functional panels 120A-D are vertically aligned in a single row that is horizontally oriented.

Multi-functional panel 122 is generated by controller 114 at a center of FGP 100 and presents non-flight parameter based information. For example, controller 114 may generate Air Traffic Controller (ATC) transcription, taxi instructions, a keypad, a clock, a text communication, a mirror of a portable device application, a cryptographic authentication feature, or other non-flight parameter information on multi-functional panel 122. In the example provided, FGP 100 recognizes heading, altitude, and speed parameters within ATC transcripts. These recognized parameters may be "accepted" and directly implemented in FGP 100 from standby to active. Accordingly, a pilot does not need to manually enter the new ATC parameters and pilot workload is reduced. In some embodiments, FGP 100 is configured to automatically set the new parameters in the respective functional panel.

Each of first user input portion 112A and second user input portion 112B includes a knob 130, a first button 132A, a second button 132B, and a panel selector 134. Knob 130 includes an outer component 140, an inner component 142, and a push button 143. Inner component 142 and outer component 140 are coaxially aligned and outer component 140 circumscribes inner component 142. In the example provided, inner component 142 and outer component 140 are rotatable and include rotary encoders to provide rotational position information to controller 114. In some embodiments, at least one of inner component 140 and outer component 140 includes a collar that limits the turn of the respective component to one of only two valid states. For example, rotating the component 130 or 140 clockwise to a predetermined clockwise rotation limit may be associated with changing between different modes of operation, such as between track and heading in the Lateral panel. Rotating the component 130 or 140 counterclockwise to a predetermined counterclockwise rotation limit may be associated with changing modes between Heading and Track in the Lateral Panel. In some embodiments, one of components 130 and 140 is associated with an optical encoder and the other of components 130 and 140 is associated with a collar. It should be appreciated that any knob configuration may be utilized without departing from the scope of the present disclosure. In some embodiments, knob 130 is omitted.

Controller 114 is configured to adjust flight parameter values of a selected functional panel at a first increment in response to rotation of outer component 140 and at a second increment in response to rotation of inner component 142. For example, when the selected functional panel is a Lateral panel, outer component 140 may change the heading value by ten degrees per rotational increment, while inner component 142 may change the heading value by one degree per rotational increment. It should be appreciated that other increments may be utilized without departing form the scope of the present disclosure.

Buttons 132A-B are disposed on each horizontally adjacent side of knob 130. Buttons 132A-B and push button 143 may be utilized to make selections and change modes in FGP 100. In the example provided, buttons 132A-B and push button 143 are mechanical momentary push buttons. In some embodiments, buttons 132A-B and button 143 may be touch enabled icons. In some embodiments, buttons 132A-B are omitted.

Panel selector 134 receives panel selection inputs to select one of panels 120A-D and 122 for to be active for editing with buttons 132A-B and knob 130. Controller 114 is configured for controlling at least one of first functional panel 120A, second functional panel 120B, third functional panel 120C, fourth functional panel 120D, and multi-function panel 122 based on the panel selection inputs. Controller 114 is configured to present—on the touchscreen input portion—a list of functional panels. In the example provided, panel selector 134 is a touchscreen input portion, the list of functional panels is indicated by the first letter of the flight parameter associated with the respective panel, and controller 114 further presents the center multi-function panel 122 in panel selector 134. In some embodiments, the list of functional panels is indicated by symbolic glyphs instead of or in addition to the alphanumeric first letter glyphs.

FGP 100 further presents selected panel indicators 150 and 152 generated by controller 114. Selected panel indicator 150 is associated with panel selector 134 and selected panel indicator 152 is associated with display 110. Selected panel indicators 150 and 152 indicate whether one of first functional panel 120A, second functional panel 120B, third functional panel 120C, fourth functional panel 120D, and multi-functional panel 122 is selected for adjustment. For example, a pilot may slide a finger over multiple icons to make the selection. As each icon is highlighted, the associated panel will be indicated to clearly show which panel is currently active and ready for pilot input. For example, selected panel indicators 150 and 152 may be an alternative color or a highlighted border in the selected panel. In the example provided, selected panel indicators 150 and 152 are highlighted borders.

Controller 114 is configured as described above and is configured to perform the tasks of method 200 described below. Controller 114 is a hardware device that carries out instructions of a computer program to perform the functions of FGP 100. Controller 114 is a special purpose computer configured to execute the computer program to provide the functions described herein. Controller 114 includes one or more memory units that store electronic data and computer programs. For example, the memory units may be flash memory, spin-transfer torque random access memory (STT-RAM), magnetic memory, phase-change memory (PCM), dynamic random access memory (DRAM), or other suitable electronic storage media. In the example provided, the memory units store control logic with instructions that cooperate with a processor of controller 114 to perform operations of the method described below. In some embodiments, the processor may include one or more central processing units ("CPUs"), a microprocessor, an application specific integrated circuit ("ASIC"), a Field Programmable Gate Array (FGPA), a microcontroller, and/or other suitable device. Furthermore, controller 114 may utilize multiple hardware devices communicating across a data bus, as is also appreciated by those of ordinary skill in the art.

Controller 114 is configured to provide the functions associated with a flight guidance panel in addition to the specific features of a multi-functional display. In general, controller 114 receives inputs, calculates instructions, and generates instructions for display 110 to present information related to the state of the aircraft. Although controller 114 is described herein as a part of FGP 100, it should be appreciated that controller 114 may be a separate component or components in a separate housing or housings without departing from the scope of the present disclosure.

Eye tracking sensor 116 is configured to indicate where an eye of a user is focused. Controller 114 is further configured for adjusting values based on an input from the eye tracking sensor and based on inputs at one of the first user input portion and the second user input portion. For example, controller 114 may select the active panel based on an input from eye tracking sensor 116 for adjustment by user input portion 112A or 112B. In some embodiments, eye tracking sensor 116 is omitted. In some embodiments, only one eye tracking sensor 116 is included.

Proximity sensor 118 is configured to indicate when an object is near FGP 100. Controller 114 is further configured for decluttering display 110 based on an input from the proximity sensor. For example, after a predetermined time of inactivity, controller 114 will present only required information on display 110 until proximity sensor 118 indicates an object—such as a pilot's hand—is approaching FGP 100. When proximity sensor 118 indicates the object is approaching FGP 100, controller 114 will present on display 110 more detailed information, such as selectors and menus. In some embodiments, proximity sensor 118 is omitted. In some embodiments, only one proximity sensor 118 is included.

Figure 2:
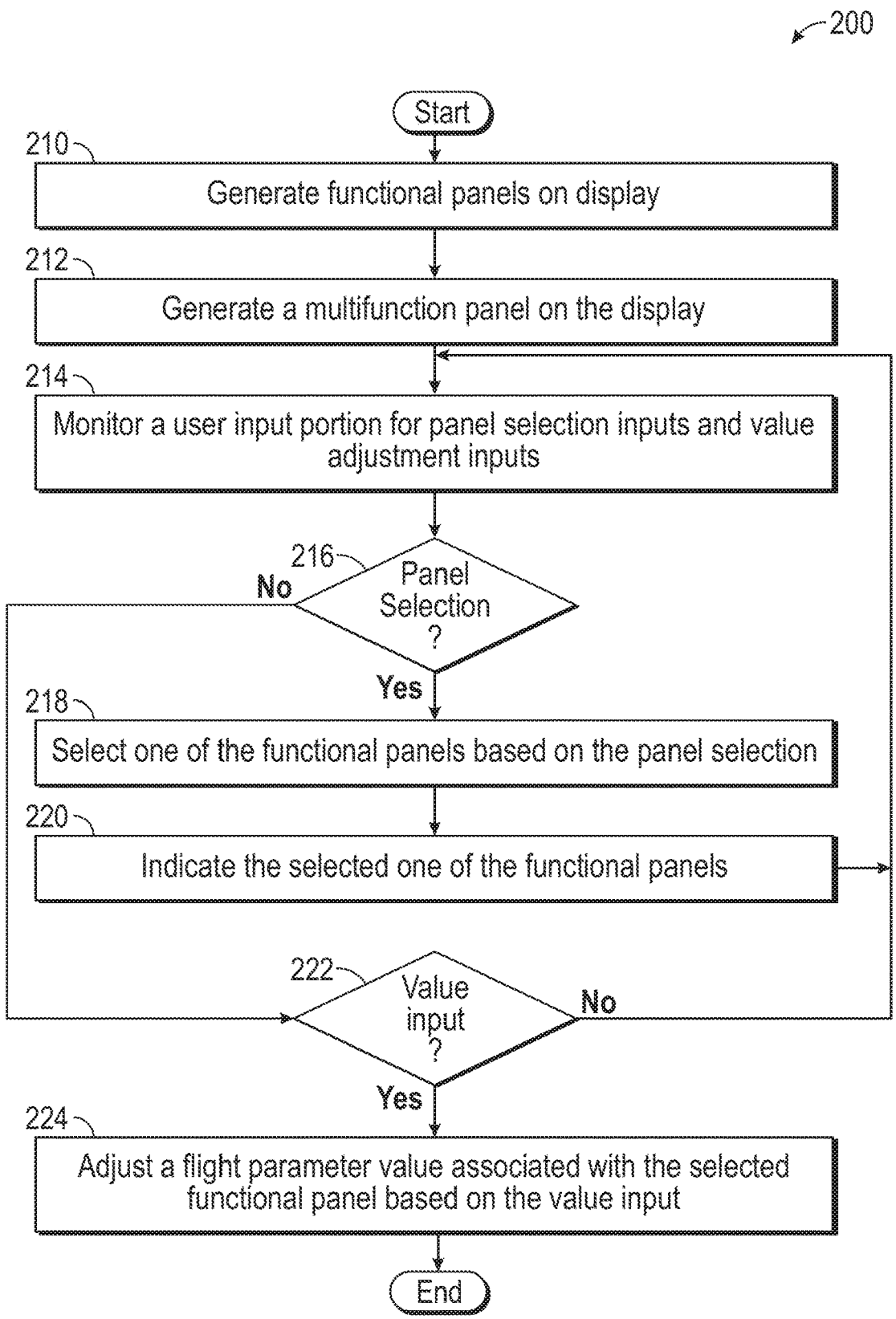
FIG. 2 is a simplified flow diagram illustrating a non-limiting embodiment of a method for operating a flight guidance panel in accordance with the teachings of the present disclosure.

Referring now to FIG. 2, and with continued reference to FIG. 1, a simplified flow diagram illustrates a method 200 of operating a flight guidance panel. In the example provided, controller 114 performs the tasks of method 200.

Task 210 generates functional panels on a display. For example, controller 114 may generate first functional panel 120A, second functional panel 120B, third functional panel 120C, and fourth functional panel 120D on display 110. Task 212 generates a multi-functional panel on the display. For example, controller 114 may generate multi-function panel 122 on display 110.

Task 214 monitors a user input portion for panel selection inputs and value adjustment inputs. For example, controller 114 may monitor outputs of first user input portion 112A and second user input portion 112B. Task 216 determines whether there has been a panel selection input. For example, controller 114 may determine there has been a panel selection input when a pilot selects the Lateral panel associated with first functional panel 120A on panel selector 134. When there is not a panel selection input, method 200 proceeds to task 222. When there is a panel selection input, method 200 proceeds to task 218.

Task 218 selects one of the functional panels based on the panel selection input. For example, controller 114 may select first functional panel 120A as a selected active functional panel that may be adjusted by interaction with user input portions 112A and 112B. Task 220 indicates the selected one of the functional panels. For example, controller 114 may generate selected panel indicator 150 on panel selector 134 and/or may generate selected panel indicator 152 on display 110.

Task 222 determines whether a user has entered a value input. For example, controller 114 may determine whether inner component 142 or outer component 140 of knob 130 has been rotated. When a user has not entered the value input, method 200 returns to task 214. When the user has entered the value input, method 200 proceeds to task 224.

Task 224 adjusts a flight parameter value associated with the selected functional panel based on the value input. For example, controller 114 may change the lateral heading flight parameter in first functional panel 120A based on rotation of outer component 140 or inner component 142 of knob 130.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A flight guidance panel for an aircraft, the flight guidance panel comprising:

a first user input portion disposed on a pilot's side of the flight guidance panel, the first user input portion comprising a first panel selector that receives first panel selection input to select one of a plurality of displayed functional panels to be active for adjustment;

a second user input portion disposed on a co-pilot's side of the flight guidance panel, the second user input portion comprising a second panel selector that receives second panel selection input to select one of the plurality of displayed functional panels to be active for adjustment, wherein the second user input portion provides redundancy for the first user input portion;

a display disposed between the first user input portion and the second user input portion, wherein the first user input portion is distinct and separate from the display, the second user input portion is distinct and separate from the display, and the second user input portion is distinct and separate from the first user input portion; and a controller configured for:

generating the plurality of displayed functional panels for presentation on the display, each of the plurality of displayed functional panels associated with a respective flight parameter of the aircraft, each of the displayed functional panels being void of control knobs;

selecting one of the plurality of functional panels to be an active functional panel for editing with the first user input portion or the second user input portion, wherein the selecting is responsive to a panel selection input received from the first panel selector or the second panel selector; and selectively controlling, with input from a first control knob of the first user input portion or input from a second control knob of the second user input portion, the active functional panel to adjust the respective flight parameter of the aircraft that is associated with the active functional panel;

wherein each of the first panel selector and the second panel selector comprises a respective touchscreen input portion, and wherein the controller is further configured to present, on each touchscreen input portion, a list that identifies the plurality of functional panels as selectable icons.

2. The flight guidance panel of claim 1, wherein the first control knob and the second control knob each includes an outer component and an inner component and the first user input portion and the second user input portion include a third button disposed on the knob, and wherein the controller is further configured to adjust flight parameter values at a first increment in response to rotation of the outer component and at a second increment in response to rotation of the inner component.

3. The flight guidance panel of claim 1, wherein the controller is further configured for generating a selected panel indicator on at least one of the display, the first panel selector, and the second panel selector indicating whether one of the plurality of functional panels is selected for adjustment.

4. The flight guidance panel of claim 1, wherein the controller is further configured for generating a multi-function panel on the display, wherein generating the multi-function panel includes generating non-flight parameter based information.

5. The flight guidance panel of claim 4, wherein the controller is further configured for generating the multi-function panel in a center of the display.

6. The flight guidance panel of claim 4, wherein the generating non-flight parameter based information includes generating at least one of an Air Traffic Controller transcription, taxi instructions, a keypad, a clock, a text communication, a mirror of a portable device application, and a cryptographic authentication feature.

7. The flight guidance panel of claim 1, further comprising an eye tracking sensor, and wherein the controller is further configured for adjusting values based on an input from the eye tracking sensor and based on inputs at one of the first user input portion and the second user input portion.

8. The flight guidance panel of claim 1, further comprising a proximity sensor, and wherein the controller is further configured for decluttering the display based on an input from the proximity sensor.

9. The flight guidance panel of claim 1, wherein the display is composed of single touch capable screen.

10. A flight guidance panel for an aircraft, the flight guidance panel comprising:
  a user input portion comprising a panel selector that receives panel selection input to select one of a plurality of displayed functional panels to be active for adjustment, and further comprising a control component;
  a display disposed next to the user input portion, wherein the user input portion is distinct and separate from the display; and
  a controller configured for:
    displaying the plurality of functional panels on the display, each of the plurality of functional panels associated with a respective flight parameter of the aircraft, and each of the plurality of functional panels being void of control knobs;
    selecting one of the plurality of functional panels to be an active functional panel for editing with the user input portion, wherein the selecting is responsive to a panel selection input received from the panel selector of the user input portion; and
    selectively controlling, with input from the control component of the user input portion, the active functional panel to adjust the respective flight parameter of the aircraft that is associated with the active functional panel;
  wherein the control component of the user input portion is configured to selectively control any of the plurality of functional panels when selected to be an active functional panel; and
  wherein the panel selector of the user input portion comprises a touchscreen input portion, and wherein the controller is further configured to present, on the touchscreen input portion, a list that identifies the plurality of functional panels as selectable icons.

11. The flight guidance panel of claim 10, wherein the control component of the user input portion includes an outer component and an inner component for adjusting flight parameter values at a first increment in response to rotation of the outer component and at a second increment in response to rotation of the inner component.

12. The flight guidance panel of claim 10, wherein the panel selector is a touchscreen input portion configured to present a list that identifies the plurality of functional panels.

13. The flight guidance panel of claim 10, further comprising an eye tracking sensor configured for receiving the panel selection inputs.

14. The flight guidance panel of claim 10, further comprising a proximity sensor configured for generating outputs indicating when the controller should declutter the display.

15. The flight guidance panel of claim 10, wherein the display is composed of single touch capable screen configured to present the plurality of functional panels in a single row.

* * * * *